US012701640B2

(12) United States Patent
Rave et al.

(10) Patent No.: US 12,701,640 B2
(45) Date of Patent: Aug. 4, 2026

(54) HEATING ELEMENT WITH OPEN-CELL STRUCTURE

(71) Applicant: KANTHAL AB, Hallstahammar (SE)

(72) Inventors: Fernando Rave, Hallstahammar (SE); Thomas Lewin, Hallstahammar (SE); Pengcheng Cao, Hallstahammar (SE)

(73) Assignee: Kanthal AB, Hallstahammar (SE)

( * ) Notice: Subject to any disclaimer, the term of this patent is extended or adjusted under 35 U.S.C. 154(b) by 1124 days.

(21) Appl. No.: 17/770,076

(22) PCT Filed: Oct. 28, 2020

(86) PCT No.: PCT/EP2020/080262

§ 371 (c)(1),
(2) Date: Apr. 19, 2022

(87) PCT Pub. No.: WO2021/083947

PCT Pub. Date: May 6, 2021

(65) Prior Publication Data

US 2022/0400537 A1 Dec. 15, 2022

(30) Foreign Application Priority Data

Oct. 31, 2019 (EP) .................................... 19206639

(51) Int. Cl.
*H05B 3/12* (2006.01)

(52) U.S. Cl.
CPC ......... *H05B 3/12* (2013.01); *H05B 2203/017* (2013.01)

(58) Field of Classification Search
None
See application file for complete search history.

(56) References Cited

U.S. PATENT DOCUMENTS

| | | | | | |
|---|---|---|---|---|---|
| 3,244,860 | A | | 4/1966 | Lindley | |
| 3,798,417 | A | | 3/1974 | Bittner | |
| 3,927,300 | A | * | 12/1975 | Wada | H05B 3/141 392/362 |
| 4,025,754 | A | * | 5/1977 | Marzonie | D06F 58/26 219/400 |

(Continued)

FOREIGN PATENT DOCUMENTS

| | | | |
|---|---|---|---|
| CN | 103269770 | A | 8/2013 |
| CN | 107023993 | A | 8/2017 |

(Continued)

OTHER PUBLICATIONS

Office Action dated Oct. 7, 2024, issued in corresponding Japanese Patent Application No. 2022-524985.

(Continued)

*Primary Examiner* — Thor S Campbell
(74) *Attorney, Agent, or Firm* — Morgan, Lewis & Bockius LLP

(57) ABSTRACT

A heating element comprises a main body having a three-dimensional matrix with an open structure including openings and internal voids, cavities and/or pores extending throughout the main body. The three-dimensional matrix is provided as a lattice having a repeating unit cell extending in three directions. The present heating element is adapted for maximised surface area so as to provide an effective and efficient thermal energy transfer medium.

24 Claims, 7 Drawing Sheets

(56) References Cited

U.S. PATENT DOCUMENTS

| | | | | |
|---|---|---|---|---|
| 4,232,214 | A * | 11/1980 | Shioi | H01C 7/022 219/541 |
| 4,935,687 | A * | 6/1990 | Ton-That | F24H 3/002 392/347 |
| 9,468,921 | B2 | 10/2016 | Kondo et al. | |
| 11,751,289 | B2 * | 9/2023 | Ptasienski | H05B 3/283 219/541 |
| 2008/0149304 | A1 | 6/2008 | Slaughter | |
| 2010/0220985 | A1 | 9/2010 | Eisenhauer et al. | |
| 2018/0274817 | A1 | 9/2018 | Faulkner et al. | |
| 2022/0400537 | A1 * | 12/2022 | Rave | F24H 1/103 |
| 2023/0213132 | A1 * | 7/2023 | Peretti | F16L 53/38 392/468 |
| 2023/0319956 | A1 * | 10/2023 | Zambrana | H01Q 21/24 219/691 |
| 2023/0395812 | A1 * | 12/2023 | Mohanram | H01M 4/861 |
| 2024/0075457 | A1 * | 3/2024 | Lanigan-Atkins | B01J 20/08 |
| 2025/0041829 | A1 * | 2/2025 | Lefevere | B01J 20/286 |
| 2025/0058877 | A1 * | 2/2025 | Davis | B64D 11/0647 |

FOREIGN PATENT DOCUMENTS

| | | | |
|---|---|---|---|
| DE | 102016012795 | A1 | 4/2018 |
| FR | 3026171 | A1 | 3/2016 |
| JP | S54-084637 | A | 7/1979 |
| JP | 2006-225182 | A | 8/2006 |
| JP | 2011-040343 | A | 2/2011 |
| JP | 2012-238415 | A | 12/2012 |
| WO | 2013/163398 | A1 | 10/2013 |
| WO | 2021/191155 | A1 | 9/2021 |

OTHER PUBLICATIONS

Examination Report dated Dec. 7, 2022, issued in corresponding Indian Patent Application No. 202227016184.

Office Action dated Aug. 23, 2024, issued in corresponding Chinese Patent Application No. 202080074037.2.

International Search Report and Written Opinion dated Dec. 2, 2020, issued in corresponding International Patent Application No. PCT/EP2020/080262.

* cited by examiner

HEATING ELEMENT WITH OPEN-CELL STRUCTURE

FIELD OF INVENTION

The present invention relates to a heating element for the transfer of heat energy.

BACKGROUND ART

Electric heaters typically include an electrical resistance heating element to heat a fluid or a solid object. Conventionally, relatively thin wires, strips or tubes of metal alloy are used as the heating elements with the heating effect achieved by the passage of current and the wire's, or tube's, electrical resistance.

Existing heating elements have a limited energy transfer efficiency due largely to their relatively small area-to-volume ratio. Moreover, larger heating elements can be heavy and structurally weak. As such, they tend to deform, sag and creep following repeated high temperature operations.

It is also difficult to adapt conventional heating elements to the available voltage/current source in use as well as providing uniform heating of an irregular solid object when heating by radiation.

Accordingly, there exists a need for more effective and efficient heating elements to transfer thermal energy in heating devices and the like.

U.S. Pat. No. 3,244,860 discloses a heater for gas comprising a metal mesh electrical resistance heating element arranged in a casing. A number of concentrically arranged individual mesh strips form the heating element. A gas flows through the casing and the mesh strips and is thus, heated.

US 2018/0274817 discloses an inline fluid heater. A body of the heater is indirectly heated by a heating element, which is electrically heated. The body includes inlet and outlet ports for the fluid to be heated. In the context of tubular conduits extending through the body, 3D printing of aluminium is proposed as a production method for the body.

SUMMARY OF THE INVENTION

It is one objective of the present invention to provide a heating element. The heating element may be configured for a heating device, assembly or apparatus. The heating element offers enhanced thermal energy transfer from a body of the heating element to a receiving phase such as a fluid flowing in contact with the heating element or to a solid body to be heated by radiation. It is a further specific objective to provide a heating element offering enhanced structural and mechanical properties and in particular flexural strength so as to withstand vibrations and movements of the heating element relative to other components of the heating assembly such as a surrounding or encapsulating ceramic block or other secondary bodies (optionally including further heating wires).

It is a further specific objective to provide a heating element having both structural and mechanical properties so that it is resistant to stresses and the general physical demands encountered in use resultant from large pressure differentials, gravitational forces and cyclical heating gradients. In particular, it is a specific objective to provide a high strength and lightweight heating element adapted to be resistant to deformation, sagging and creep following repeated high temperature operations.

It is a further objective to provide a heating element that may be configured as the primary or active heating element through which current flows predominantly or preferentially. It is a further objective to provide a heating element that may be configured as the passive heating element relative to one or more secondary bodies through which current flows predominantly or preferentially, or which secondary body is heated by combustion of gas. In such an implementation, the present 3-dimensional matrix may firstly provide structural support to a secondary body, such as a thin wire, strip, plate or tube, and secondly may significantly enhance the heat transfer effect of the secondary body, such as by increasing a surface area of the secondary body.

The objectives are achieved by a heating element comprising: a main body, the main body being a three-dimensional matrix having an open structure defining openings, voids and/or pores extending through the main body. The three-dimensional matrix is provided as a lattice having a repeating unit cell to define at least part of the main body. The main body comprises at least two unit cells positioned adjacent to each other in a first direction, at least two unit cells positioned adjacent to each other in a second direction, and at least two unit cells positioned adjacent to each other in a third direction. The first, second, and third directions are arranged at an angle to each other. Such a configuration maximises the surface area-to-volume ratio of the heating element and in turn enhanced thermal energy transfer.

The 3-dimensional latticework matrix has a regular structure. Accordingly, irregular structures such as foam or non-woven mesh are not 3-dimensional latticework matrixes. The unit cells of the lattice of the 3-dimensional matrix are accordingly arranged regularly in the main body. The unit cells of the lattice of the 3-dimensional matrix may be arranged symmetrically in the main body. In the lattice of the main body, each of the first, second, and third directions defining the adjacent positions of the unit cells, extend at the same angle to each other. That is, the angle between the first and second directions equals the angel between the second and third directions and the angel between the first and third directions.

The present 3-dimensional matrix/open structure is further advantageous to withstand the thermal, physical and mechanical demands within heating devices, electric heaters, ovens, furnaces etc. The present heating element is further advantageous as it can be formed into any shape and configuration. This is achieved as it is lightweight and strong and may be manufactured by techniques such as 3D printing, additive manufacturing, etc. Due to the open structure of the latticework matrix, a fluid is capable of passing through the element without requiring a dedicated opening in the structure. Such an open structure can also structurally support solid body heating elements. Consequently, such solid body heating elements may be designed in new ways which would be impossible without the lightweight structural support provided by the latticework matrix. Additionally, such a latticework matrix structure may serve to increase a surface area of a solid body heating element.

A further advantage of the present open-structure heating element is the availability and freedom of choice to design almost any configuration of current and fluid flow pathway through the matrix when the present element is employed for direct resistive heating, i.e. active, if the matrix comprises an electrically conductive material. The element may alternatively be implemented for passive heating i.e., in combination with at least one secondary body through which current is directed to flow predominantly or preferentially relative to the 3-dimensional matrix part of the element.

A relatively dense latticework matrix structure will provide a higher fluid flow resistance and a lower electric resistance than a less dense latticework matrix structure. Accordingly, the present heating element, for example when formed as a 3D printed structure, enables the design of different pathways for the flow of current and also for the fluid flow. Additionally, the pathways for the flow of current may vary in cross sectional area thereby provide structural regions that may differ in their respective density of material, matrix pattern, type and/or shape etc. Also, the design of different pathways for fluid flow may vary in cross sectional area through the heating element.

Such considerations apply to both a main body matrix part of the element and/or the secondary body. Optionally, the secondary body, e.g. at least one thin rod, wire, strip, plate or tube, may be formed integrally with the main body open structure matrix. Optionally, the secondary body may be a body integrally formed with the main body, having a more dense latticework structure than the main body. Accordingly, the present latticework structure may be used as a passive reinforcing structure for a secondary body or element acting/functioning as the primary active electrical conductor. Optionally, the secondary body has a lower electrical resistivity than the main body.

Accordingly, the heating element may comprise an electrically conductive secondary body, the main body being positioned adjacent the secondary body.

The present configuration via the open structure facilitates stabilisation of the heating element when implemented adjacent further components of a heating device such as a surrounding ceramic jacket block, further heating element or outer casing/housing. In particular, the open structure matrix may be branched or comprise radial projections adapted for physical attachment or abutment with potentially adjacent components of the heating device. Such radial attachments may be formed integrally as part of the present structure. For example, such stabilising components may include stabilising discs, rods, blocks, fins, braces, brackets or flanges.

The present open structure matrix comprising latticework structure may be manufactured, for example, by additive manufacturing. The open structure matrix may comprise 'terminals' at opposite ends of the latticework structure, with such terminals enabling connection of the latticework structure to suitable electrical connections/conduits for the application of a voltage to the heating element. Such terminals may be manufactured with the latticework structure, for example via additive manufacturing, so as to be formed as a unitary body. This is advantageous to provide a structurally strong element. Such a configuration would provide the heating element having regions of open latticework and respective terminal end regions represented by generally more dense or solid body portions for example as a layer, plate, disc or other generally solid body being devoid of the same type of openings, voids or pores of the open matrix.

According to a first aspect of the present invention there is provided, a heating element comprising: a main body; the main body being a three-dimensional matrix having an open structure defining openings, voids and/or pores extending through the main body, as defined in claim 1.

The present heating element may be adapted to transfer heat to a fluid via conduction or convection or to a solid body via radiation. As will be appreciated, the present heating element is suitable for use with a variety of different energy receiving phases including a variety of fluids, such as gases or liquids, and solid bodies.

The heating element may be configured for the transfer of heat in a heating device, assembly or apparatus.

A particular advantage of the present heating element when employed to heat a solid body via radiation is that the latticework open structure may be adapted to provide a structural scaffold to structurally support and add strength to a secondary body being for example a generally more dense or solid body portion, optionally formed integrally with the latticework main body, or separate secondary body heating element positioned adjacent to the present matrix. That is, the present open structure latticework provides a desired stiffness and/or flexural strength relative to a secondary body particularly when formed as a relatively thin wire, strip, filament or tubular type body or element that may have a tendency to deform over time.

The herein discussed heating element having an open structure is formed as a 3-dimensional latticework matrix with openings and internal voids, pores, cavities, channels. This open structure is herein referred to with different terms, such as: three/3-dimensional structure, three/3-dimensional matrix, matrix latticework structure, latticework matrix structure, open structure of latticework matrix, lattice matrix, latticework matrix, latticework open structure, skeletal matrix, 3-dimensional matrix open structure, three-dimensional open-cell structure formed as a latticework. As such, the same kind of structure is referred to by these terms.

Reference within the specification to a 'three/3-dimensional matrix' or '3-dimensional matrix' encompasses an ordered array, repeating unit cell arrangement, lattice framework. That is, a 3-dimensional matrix, latticework matrix, etc. is a three-dimensional regular structure having nodes and comprising strands extending between the nodes in three dimensions, i.e. the strands connecting at least some of the nodes with other nodes in three dimensions. Thus, the 3-dimensional matrix forms a main body having a volume. Additionally, this term also encompasses a 3-dimensional matrix having different regions of regular and ordered repeating units, with such regions differing in any one or a combination of shape, pattern, apparent material density, matrix 'strand' thickness, cross sectional area or width, for example in a plane perpendicular to the current and/or fluid flow. Reference within this specification to matrix 'strand' encompasses the main body portion that is branched or skeletal to define the network and internal pores, voids, cavities or openings. The 3-dimensional strands of the matrix may be considered a skeleton, branched or jointed structure defining internal pores, voids or openings of a size, shape and distribution within specific regions that are regular. The strands may thus encompass structures such as threads, filaments, wires, rods, strips, etc., from which unit cell structures are formed. The strands are joined at the nodes of the 3-dimensional matrix. Also said differently, the nodes are formed at connection points between at least three strands, or at least four strands, or at least six strands.

The herein used terms "latticework" and "lattice" relates to a framework comprising the strands of the matrix.

Accordingly, the lattice comprises strands.

Also, the strands connect to each other in nodes to form the lattice of the three-dimensional matrix.

Reference within the specification to the matrix having an 'open' structure encompass a generally porous rigid main body configuration defining porous or open-cell heating element. As an example, where the present heating element is elongate, at a cross-sectional plane perpendicular to the longitudinal axis, the cross-section includes the material forming the strands/skeleton in addition to free, open or unoccupied regions that are referred to herein as the pores, cavities, voids etc.

The present heating element may be formed as a body in which the skeletal matrix extends throughout the heating element body from an innermost region, zone or core to an outermost surface.

However, the present heating element may be formed to comprise any shape and configuration of three-dimensional latticework that is pre-formed as an ordered array of repeating unit cells. Such structures comprise a regular latticework that may be homogenous and comprise the same repeating cell structure throughout the heating element.

Alternatively, the present heating element may be formed from regions of latticework that differ from one another to define a heterogenous latticework structure. For instance, the main body of the heating element may comprise at least a first region having a first lattice type and at least a second region having a second lattice type different to the first region. Optionally, the first and second regions differ by any one or a combination of: a shape or geometry of the lattice; a density of the lattice meaning the weight of lattice divided by the overall space of the lattice; a cross-sectional area, thickness or width of strands that form the lattice; a size, shape or number/amount of openings, voids and/or pores that extend throughout the main body or the general pattern at a particular region. Optionally, the first and second regions are positioned to extend in a lengthwise direction of the heating element between respective terminal ends. Optionally, the first and second regions are positioned to extend in a widthwise direction across the heating element relative to a lengthwise direction extending between respective terminal ends. Optionally, the first and second regions are positioned to extend in a combination of lengthwise and widthwise direction across the heating element relative to a lengthwise direction extending between respective terminal ends. Optionally, the first and second regions are positioned to extend orthogonally to both the lengthwise and widthwise directions.

The matrix is provided as a lattice having a repeating unit cell to define a main body having a pattern. Optionally, the pattern may be uniform at the main body having openings, voids and/or pores of a size and shape that are generally homogenous (i.e., of generally equal dimensions) throughout the main body. Such a uniform main body configuration may be manufactured via additive manufacturing or other common manufacturing methods in which a unit cell is repeated throughout the length and thickness of the body. Accordingly, the main body may be a result of an additive manufacturing process.

Optionally, the heating element main body may be elongate. That is, the heating element formed from the lattice matrix may comprise what may be regarded as respective lengthwise ends. The lengthwise ends may be configured as terminal ends for connection to suitable electrical conduits for the transfer of current through the heating element, through the main or secondary body thereof.

Optionally, a diameter or width of one of the repeating cell elements of the matrix may be in the region of at least 0.1 mm, suitable for use in electric heaters, ovens, furnaces, static or mobile heating devices including atomisers for use in electronic cigarettes and the like.

Optionally, the main body may be formed as an elongate cylindrical structure.

Optionally, the heating element and in particular the main body may be configured for passive or active heating. In particular, the main body formed from the latticework repeating unit cell may be provided in combination with a secondary body and the secondary body being configured for active heating. Such a secondary body, optionally formed non-integrally with the main body, may include a heating element positioned in close proximity, in touching contact, in partial touching contact, or in non-touching contact with the present 3-dimensional main body.

Accordingly, the main body also referred to as the primary body, in the form of the three-dimensional matrix may be active, in the sense that it is directly heated by an electric current which is directed through the main body, and thus, heats the main body. The main body transfers its heat to the fluid. Alternatively, the main body in the form of the three-dimensional matrix may be passive, in the sense that it is heated indirectly by a secondary body. Again, it is the main body that transfers its heat to the fluid.

Where the present heating element comprises a secondary body, the secondary body is preferably the active element having an electrical resistance lower than the main body. In such an arrangement very little current would pass through the main body latticework to provide the passive configuration. In such an arrangement, the latticework main body could be considered to provide primarily structural reinforcement to the secondary body (as the medium through which current flows primarily). Secondarily, the latticework main body provides the secondary body with an increased surface area, which improves heat transfer from the secondary body. Optionally, the main body and the secondary body may be formed integrally and may be produced via the same additive manufacturing process such as 3D printing.

Accordingly, the secondary body is active in the sense that it is heated by an electric current. The secondary body may be a wire, strip, filament or tubular element. Alternatively, the secondary body may be a three-dimensional matrix of a different kind than that of the main body.

Optionally, the main body may be provided as a core positioned internally within the secondary body. Optionally, the main body may be provided at least partially enclosing the secondary body that is positioned at or towards a core of the heating element. Optionally, the main body may be provided as a lateral side extension of the secondary body, for example to extend or project from one or more lateral sides. Optionally, the main body extends a full or a majority of a length, width or thickness of the secondary body so as to provide structural support between respective ends of the secondary body, if it is elongated.

The secondary body may be configured for primary electrical conduction. In such a configuration, the present 3-dimensional matrix main body is adapted to be heated by direct touching contact as current flows through the secondary body. The 3-dimensional matrix main body thereby effectively provides the secondary body with an increased surface area, as well as increased flexural strength. The secondary body may be more dense, or solid, relative to the main body, having a lower degree of, or being devoid of openings, voids and/or pores that extend through the main body. The secondary body may be formed from the same material as the main body or the main body and the secondary body may comprise a different respective material. Where the material is a metal alloy, such a 'difference' may include the relative concentrations of the various elements of the alloy or the alloys may differ in their elemental compositions.

Optionally, the heating element may further comprise a secondary body that may be regarded as a frame or having at least one frame part, the open 3-dimensional main body extending within and/or between regions of the frame part. In particular, the secondary body frame part may define end regions, edges and/or corners of a structure with the open matrix extending within and/or between the more dense, or solid frame part(s). The frame part may be formed integrally with the open-cell main body. That is, the frame part may be formed with the open matrix via the same process e.g. additive manufacturing. Optionally, the frame may be connected or attached to the main body of the present material. The more dense, or solid frame is advantageous to provide an optional primary pathway for the flow of current. Such a configuration is advantageous to minimise the applied voltage to achieve a desired current. A more dense, or solid frame part may be provided at or towards a centre of the main body. Optionally, the frame part may be provided at a perimeter of the heating element. Optionally, the frame may extend a full length of the heating element together with the 3-dimensional open structure of the main body. The frame part represents a secondary body that is generally more dense, or solid relative to the open three-dimensional matrix. That is, and preferably the frame part(s) has a significantly lower degree of, or being devoid of internal voids, pores or openings so as to be regarded as generally solid. Where the frame part is provided as terminal ends of the heating element, the matrix may extend between the terminals. Optionally, a frame part may extend between the terminals to provide a primary pathway for the flow of current relative to the open matrix, which in such a configuration would be for passive heating, i.e. being heated indirectly by heat conduction via the frame parts. Optionally, the at least one frame part may be provided inside the 3-dimensional latticework. Optionally, the heating element may comprise a plurality of frame parts representing secondary bodies formed from more dense, or solid material being substantially devoid of openings, pores and voids relative to the latticework of the main body.

Accordingly, the secondary body may comprise the same material as the main body and/or may be formed integrally with the main body.

According to embodiments, the secondary body may extend lengthwise with the main body between respective terminals of the heating element.

According to embodiments, the secondary body may extend widthwise or orthogonal to a length of the heating element.

Optionally, the present heating element may be manufactured via an additive manufacturing process. A variety of different additive manufacturing processes may be employed suitable for use with materials of the present type.

As mentioned above, the 3-dimensional latticework matrix of the main body provides a favourably large surface area-to-volume ratio of the heating element and in turn enhanced thermal energy transfer.

According to embodiments, the main body may comprise a surface area-to-volume ratio not greater than 95:1, such as 1:1 to 95:1.

According to embodiments, the electrically conductive material may be selected from the group of iron-chromium-aluminium alloy; nickel-chromium alloy, copper-nickel based alloy, iron-nickel-chromium alloy, nickel-iron-chromium-aluminium alloy, ceramic material, and intermetallic material. In this manner, there may be provided an electrically conductive material having a resistivity suitable for providing an active heating element when current flows through the 3-dimensional matrix structure of the main body. Furthermore, such materials are suitable for additive manufacturing, which then provides a suitable method for producing the main body.

According to embodiments, the electrically conductive material may have a resistivity within a range of from 0.1 to 1000 $\Omega mm^2/m$ According to embodiments, the main body may have been formed in an additive manufacturing process. That is, the main body may result from an additive manufacturing process.

According to a further aspect of the present invention there is provided a method of manufacturing a heating element any one of aspects and/or embodiments discussed herein via an additive manufacturing process.

According to a further aspect of the present invention, there is provided an electric heater comprising a heating element as described and claimed herein. According to a further aspect of the present invention, there is provided a furnace or oven comprising a heating element as described and claimed herein. According to a further aspect of the present invention, there is provided an atomiser for an electric cigarette having a heating element as described herein. According to a further aspect of the present invention, there is provided an electronic cigarette comprising the atomiser as described herein.

BRIEF DESCRIPTION OF DRAWINGS

A specific implementation of the present invention will now be described, by way of example only, and with reference to the accompanying drawings in which:

FIGS. 7*a* and *b* illustrate schematically unit cell configurations suitable to form the latticework main body via a manufacturing process such as additive manufacturing in which FIG. 7*a* represents a face-centred-cubic configuration and FIG. 7*b* represents a body-centred-cubic configuration;

DETAILED DESCRIPTION OF PREFERRED EMBODIMENTS OF THE INVENTION

Figure 1:
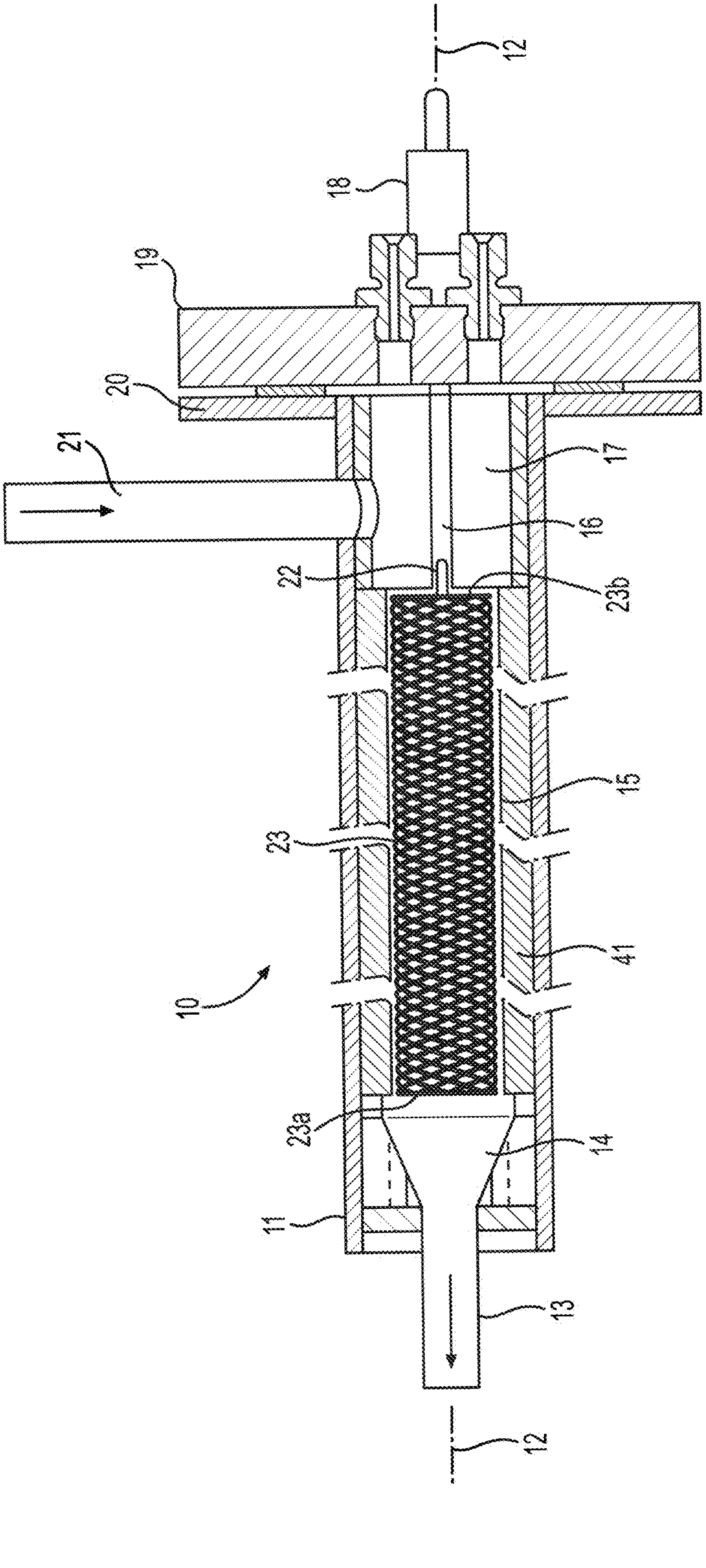
FIG. 1 is a cross-sectional side view of an electric heater incorporating a heating element according to a specific implementation of the present invention.

Referring to FIG. 1, an electric heater 10 comprises a casing in the form of a tubular sheath or housing 11 that defines an internal chamber 17. Heater 10 comprises a fluid inlet tube 21 and a fluid outlet nozzle 14 with exhaust tube 13. A fixing flange 20 is mounted to a current feed flange 19 that is in turn coupled to external electrical connections 18. A centering extension 22 that may be part of an internal heating element projects into a tube 16 to assist stabilisation of the heating assembly.

A jacket block 41 is mounted in position within chamber 17 and comprises an internal cavity 15 extending generally centrally through heater 10 aligned on a longitudinal axis 12. Elongate cavity 15 is separated from the external housing 11 via jacket block 41 formed from a suitable thermally insulating ceramic material. A heating element 23 is mounted within cavity 15.

According to the present arrangement, heating element 23 comprises a three-dimensional open-cell structure formed as a latticework.

Heating element 23 is generally elongate and comprises a first lengthwise end 23*a* positioned at outlet nozzle 14 and a second lengthwise end 23*b* positioned at or towards a terminal end of the fluid inlet tube 21. Heating element 23 is connected via suitable intermediate electrical conduits (not shown) to the external electrical connections 18. Accordingly, a voltage may be applied to heating element 23 via the conduits and electrical connections 18. In use, a fluid, such as a gas, is supplied into the electric heater 10 via inlet tube 21 to flow over, through and in contact with the element three-dimensional lattice 23 within cavity 15. As heating element 23 is formed from the electrical resistance material, the fluid is heated as it flows from tube 21 in contact with heating element 23 and exhausted from the device 10 via nozzle 14 and exhaust tube 13.

To maximise efficiency and effectiveness of thermal energy transfer between the heating element 23 and the fluid flowing within cavity 15, the present heating element 23 comprises an open three-dimensional matrix provided with openings, internal voids, pores, cavities and channels etc. extending throughout and defined by the latticework matrix of its main body. That is, the present heating element 23 may be considered to comprise a solid/rigid skeleton-like configuration. The latticework structure provides a greatly increased heating surface to volume of fluid ratio, as compared to conventional heating elements.

Referring to FIG. 1, the present heating element 23 may be formed as a regular repeating unit cell in which the openings, voids, pores comprise a size and shape that are generally uniform, i.e. of approximate equal dimensions, throughout its main body. Such a uniform regular latticework provides control of the efficiency and effectiveness of the thermal energy transfer to the flowing fluid. Additionally, such a configuration minimises any thermal gradient across the heating element both in the longitudinal axis direction and in a radial direction relative to axis 12. As will be appreciated and as illustrated in FIG. 2, the relative shapes, sizes and general dimensions of the latticework may be achieved according to various specific implementations.

The present cellular open configuration of heating element 23 may be manufactured via techniques such as additive manufacturing and computer-model based engineering manufacturing methods. Such techniques are adapted to provide a repeating unit cell configuration in which a main body 25 of heating element 23 forms a skeleton-like framework defining openings 26 and internal cavities 27.

Figure 2:
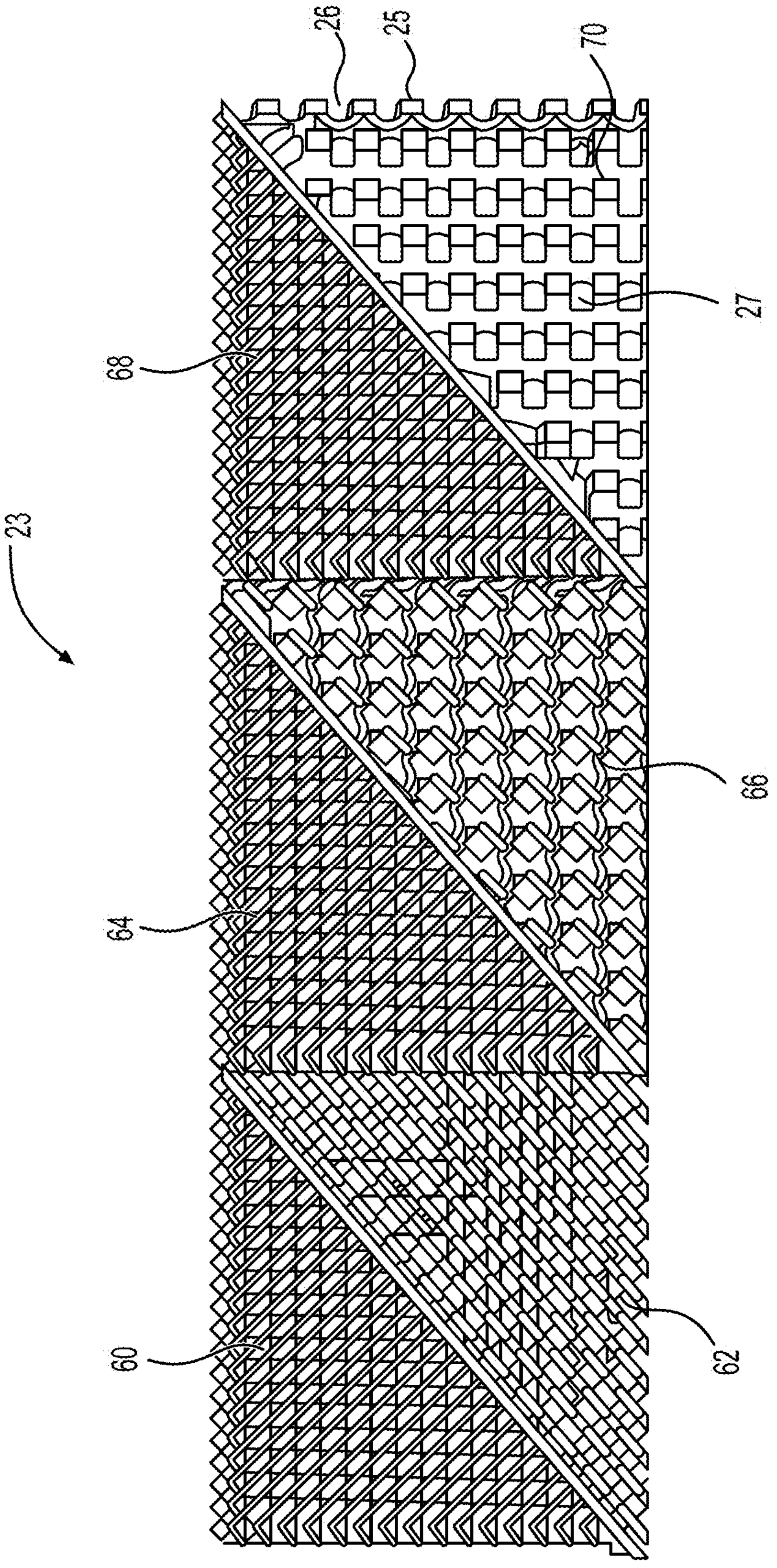
FIG. 2 illustrates schematically various different lattice configurations forming a main body of the heating element according to specific implementations.

FIG. 2 illustrates schematically various different lattice configurations forming a main body 25 of the heating element 23. More specifically, the main body 25 comprises at least a first region 60 having a first lattice type and at least a second region 62 having a second lattice type different to the first region 60.

In these embodiments, the main body 25 comprises six different regions 60-70. The first region 60 and two more regions 64, 68 have the first lattice type. The remaining three regions have differing lattice types. As already mentioned, the second region 62 has the second lattice type. A third region 66 has a third lattice type and a fourth region 70 has a fourth lattice type. In this manner, for instance the three regions 60, 64, 68 having the first lattice type may be arranged in abutment with a secondary body (not show), which is electrically heated. The first lattice type may provide favourable heat transfer from the secondary body to the main body 25, whereas the second, third, and fourth regions 62, 66, 70 may provide for optimal heat transfer to a fluid passing through the main body 25. Optionally, the second, third, and fourth regions 62, 66, 70 may provide different pressure drops to fluid passing therethrough, e.g. the highest pressure drop of the these regions may be provided by the second region 62, the third region 66 providing medium pressure drop, and the fourth region 70 providing the lowest pressure drop. According to alternative embodiments, all six regions 60-70 of the main body 25 may have different lattice types. According to further embodiments, the regions 60-70 of main body 25 may have only the first and second lattice types.

Figure 3:
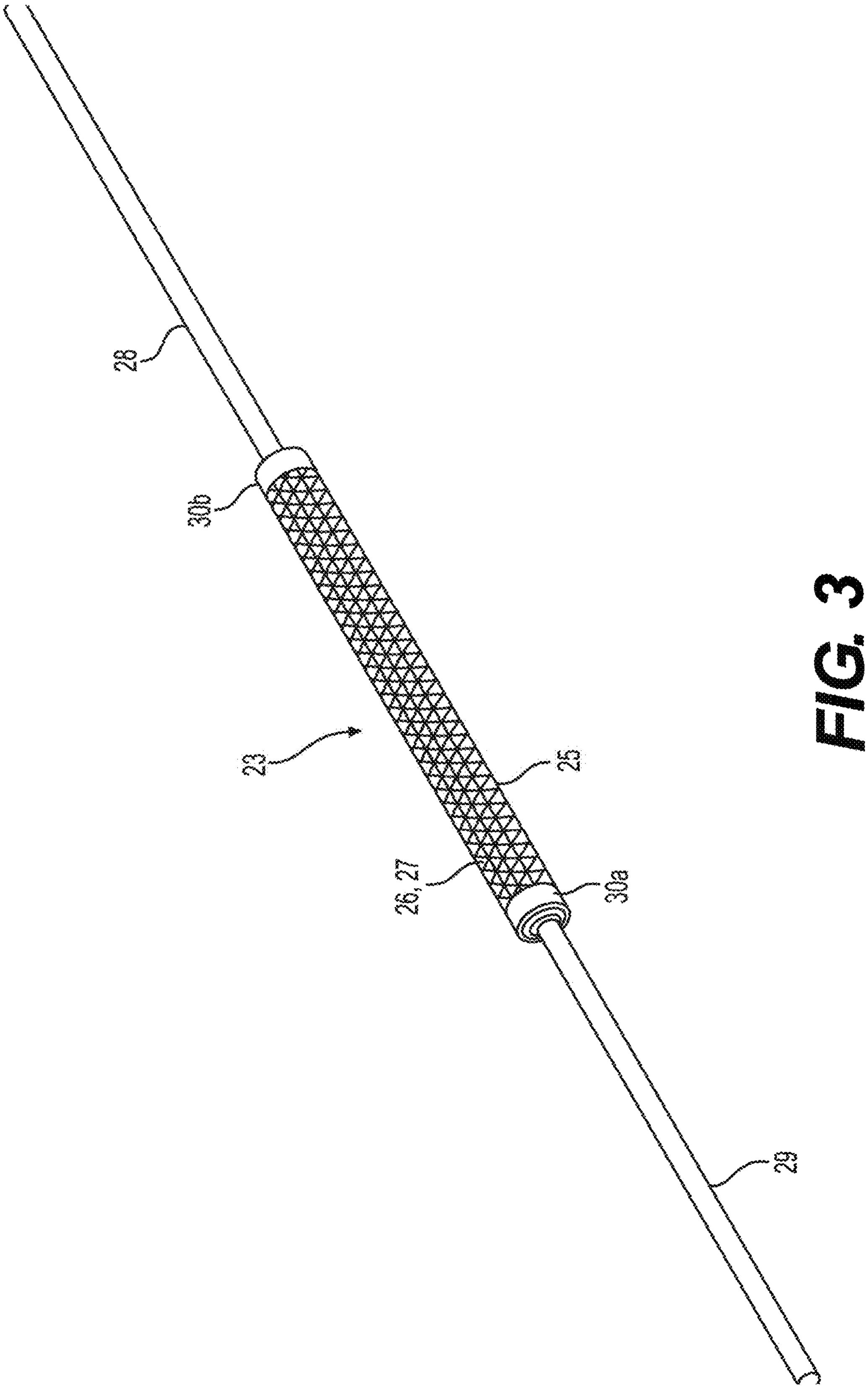
FIG. 3 is a perspective view of a heating element for incorporation within an electric heater of the type of FIG. 1 according to one specific implementation.

Referring to FIG. 3, heating element 23 may be formed as a hollow cylinder in which the latticework of the main body 25 defines the wall of the cylinder having openings 26 and internal voids 27. In particular, the latticework cylinder is both internally hollow as defined by the cylinder walls and the walls of the cylinder are also open via the openings 26 and internal voids 27. The walls of the cylinder contain the 3-dimensional latticework matrix structure. First and second lengthwise terminal ends 30*a*, 30*b* of heating element 23 are provided as solid discs. The terminal ends 30*a*, 30*b* may be formed integrally with the main body 25 or may be welded or attached to main body 25. First and second connections 28, 29 extend axially from each of the respective heating element terminal ends 30*a*, 30*b*. Accordingly, as described with reference to FIG. 1, a current may be applied through the heating element 23. Due to the increased surface area contact between the heating element 23 and the flowing fluid, resultant from the three-dimensional open latticework structure, the fluid is heated efficiently and effectively relative to conventional solid body heating elements. The size and shape of the internal voids, apertures and cavities as defined by the skeleton structure may be variable to achieve a desired global/total surface area and in turn effect the flow velocity and pathway of the fluid flowing through the heating element 23.

According to further specific implementations of the embodiment of FIG. 3, the main body 25 may extend throughout the cylinder as a latticework extending from an axial centre to the outer surface of the cylinder. As with the embodiment of FIG. 3, a current would then be passed through the latticework main body 25 that will be configured 'active' to provide the primary body through which current passes between the terminal ends. In this implementation, a fluid is preferably flowed through the main body, such as transversely to the axial extension.

According to a further implementation of the arrangement of FIG. 3, a secondary body such as a solid rod, strip or wire (not shown) of the same material as the latticework main body 25 or of a different suitable material may extend axially and internally within the latticework main body 25 between the terminal ends 30*a*, 30*b*. In such an arrangement, the secondary body provides the primary current flow pathway so as to be regarded as 'active' whilst the latticework main body 25 may be considered to provide structural reinforcement of the secondary body and would be regarded as 'passive' so as to provide heat transfer indirectly from the current flow via the secondary body. The latticework main body provides the secondary body with an increase surface area which efficiently increases the heat transfer from the secondary body.

According to specific implementations, the heating element 23 may extend continuously from an axial centre to a radially outermost surface region (radially furthest from axis 12). However, as illustrated in FIG. 3 and as discussed above, heating element 23 may be formed macroscopically as a hollow body in which the latticework structure of the main body 25 may define the wall(s) of the cylinder. According to an embodiment, a fluid may be introduced into the centre of the cylinder, and/or at the external region and/or directed to flow over the entire region of the heating element 23 including an inner bore and the outer surface. Optionally, the various embodiments based on FIG. 3 as well as other embodiments as described herein, may be configured and operational as radiating elements to radiate heat energy in response to the flow of current directly or indirectly through the main body 25.

Figure 4:
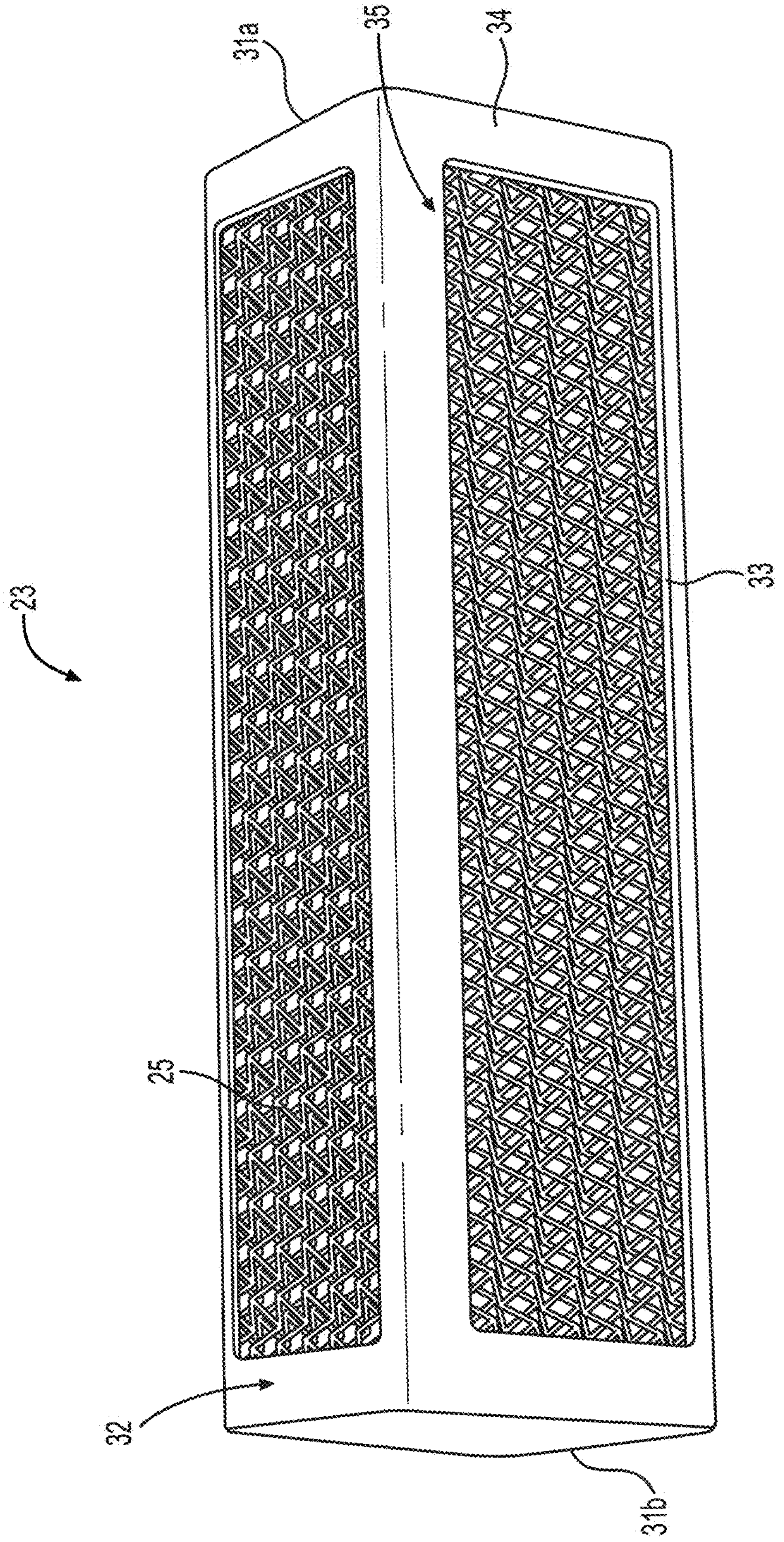
FIG. 4 is a further embodiment of a heating element having a latticework extending between regions of a frame.

A further embodiment of the present heating element is described referring to FIG. 4. According to the further embodiment, the heating element is formed as an assembly comprising a frame part 32 within which extends the latticework of the main body 25 having the open three-dimensional structure. The frame part 32 is a secondary body. Frame 32 comprises lengthwise extending edge struts 33 and widthwise extending cross braces 34. Frame 32 further comprises lengthwise first and second ends 31*a*, 31*b*. The lengthwise extending edge struts 33 and the cross braces 34 define openings 35 within which extend the latticework main body 25. Suitable terminal connections 28, 29 (not shown in FIG. 4) may be coupled to the first and second lengthwise ends 31*a*, 31*b* so as to allow a voltage to be applied to, and a current to be passed though, the heating element 23. According to the embodiment of FIG. 4, electrical current flows primarily through the frame 32, i.e. through the secondary body, and in particular the solid lengthwise extending supporting struts 33. However, some current will/may flow through the latticework main body 25. As such, the latticework body 25 may generate heat due to the current flow and/or be heated by thermal conduction via direct contact with the frame 32, or by radiation from the frame 32. Such an arrangement may be advantageous to minimise any risk of short circuiting or unstable current flow by operation at high voltages. That is via incorporation of frame part 32 current flow through the heating element 23 is facilitated relative to a heating element having exclusively the higher electrical resistance latticework body 25 and as such the applied voltage may be reduced.

Conventionally, a heating element may be formed by an electrically resistive cylindrical rod. According to the arrangement of FIG. 4, edge struts 33 may be seen as four quarters of such a cylindrical rod. Due to the spatial separation of the struts 33, the structural strength of the heating element is enhanced as compared to the conventional cylindrical rod. However, the cross-sectional area of the struts 33 is the same as the cylindrical rod. An overall resistance of the struts 33 is thus retained from the rod, while the structural strength of the heating element is greatly increased. At the same time the heating effect is also retained. As will be appreciated, the main body 25 of the arrangement of FIG. 4 is regarded as 'passive' (not the primary current pathway) whilst the struts 33 are 'active'. In such embodiments, the main body 25 provides a further structural reinforcement of the struts 33, as well as an increased heating surface to be contacted by a fluid passing through the heating element 23.

Figure 5:
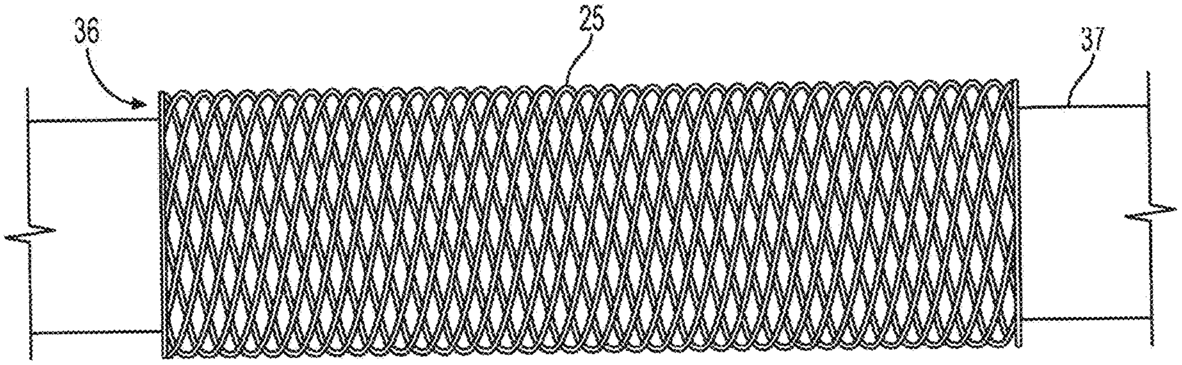
FIG. 5 is a perspective view of a heating element assembly comprising a main and a secondary body with the main body formed as a lattice extending externally around a solid secondary body according to a specific implementation.

A further embodiment is described referring to FIG. 5 in which the latticework main body is formed as a cylindrical hollow tube. A secondary body 37 extends through an internal elongate bore 36 defined by the cylindrical wall that is formed from main body 25. The secondary body 37 may for instance be a wire, a rod or a tube. Secondary body 37 comprises a non-porous, more dense, or solid material specifically adapted as a component suitable for use as a heating element. According to the embodiment of FIG. 5, secondary body 37 is positioned within bore 36 and may, or may not, be in direct contact with an internal facing surface region of main body 25. The main and secondary bodies 25, 37 may be provided in direct touching contact according to further arrangements and may also be formed integrally. In use, a voltage may be applied directly to the secondary body 37 to act as the active electrical conductor. Some electrical conduction may occur through the main body 25 although in some embodiments main body 25 is not adapted for direct current flow and is regarded as passive. In any event, as secondary body 37 is heated by the applied voltage, main body 25 may be heated via direct contact, radiation and/or conduction.

The present heating element is adaptable for use as a conducting heating element in which a fluid is directed to flow through the main body 25, acting in either active or passive modes. Additionally, the fluid may flow through the secondary body 37, such as when the secondary body is a tube. Alternatively, the present heating element may be employed as a radiating body to transfer heat energy for example to a neighbouring or adjacent solid body/mass. When operated as a conducting heating element, a fluid flowing in contact with main body 25 is allowed to flow through and within the main body latticework as described for efficient and effective thermal energy transfer. In the arrangement of FIG. 5, latticework main body 25 forms a sleeve or sheath to surround the electrically conducting secondary body 37 and provide structural reinforcement and an increased surface area.

Figure 6:
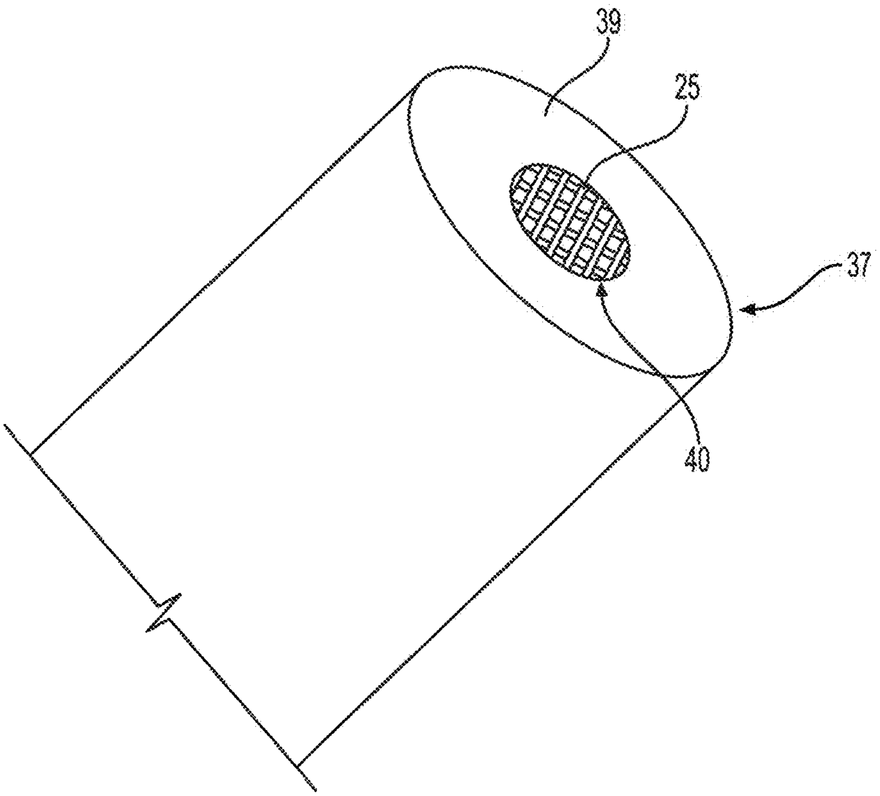
FIG. 6 is a perspective view of a further embodiment of the present invention formed as an assembly having a main body formed as a latticework representing a core that is surrounded by a generally tubular secondary body.

According to a further embodiment illustrated in FIG. 6, latticework main body 25 may be formed as a core of a heating element assembly similar to the embodiment of FIG. 5 having secondary body 37. However, according to the embodiment of FIG. 6, secondary body 37 is provided as a hollow elongate cylinder or tubular body in which the main body 25 extends through the central internal bore 40 of secondary body 37. As described referring to FIG. 5, a voltage may be applied directly to the secondary body 37 which provides a direct or indirect heating of the main body 25 via direct contact and/or conduction. A fluid may be introduced into the central bore 40 as described referring to the electric heater of FIG. 1. In such an embodiment, the main body 25 provides a high surface-to-volume ratio relative to an 'empty' secondary body. The main body 25 also provides structural reinforcement of the secondary body 37. Further, the main body 25 creates a turbulent flow of fluid flowing through the latticework, which results in an increased heating efficiency.

The matrix, i.e. the main body 25 comprises at least one electrically conductive material.

The present three-dimensional latticework main body 25 may be formed from any conventional material designed for use as a heating element. Such materials are generally regarded as electrical resistance materials and resistant to high temperature creep and corrosion, oxidation and carbonisation.

Such electrically conducting material may be selected from the group of: iron-chromium-aluminium alloy, nickel-chromium alloy, copper-nickel based alloy, iron-nickel-chromium alloy, nickel-iron-chromium-aluminium alloy, ceramic material, and intermetallic material. For instance, the iron-chromium-aluminium alloy will provide for corrosion resistance, and high temperature creep strength. Also, the nickel-chromium alloy and the iron-nickel-chromium alloy will provide for corrosion resistance but also high temperature mechanical strength and good workability. Further the copper-nickel based alloy will provide for a good thermal conductivity and also good wet corrosion property. Additionally, the iron-nickel-chromium-aluminium alloy will provide an overall mechanical strength, corrosion resistance and resistance to metal dusting. The ceramic material or the intermetallic material will provide for stability at high temperature above 1300° C.

The present open-cell, three-dimensional, construction provides a structure that is further advantageous to enhance the physical and mechanical strength of the heating element, and/or to increase the heating area of the heating element. Due to the light-weight and structurally strong latticework main body 25, the present heating element may be formed according to an unlimited number of high strength structures having one or a plurality of repeating cell geometries to define an ordered latticework. In particular, the present open-cell, 3-dimensional structure may comprise regions that differ in repeating cell structure that, in turn, provide regions offering different structural support to a secondary body and/or provide different current flow pathways of different resistance and hence magnitude of energy transfer via conduction and/or radiation. In particular, the flexural strength of the heating element may be enhanced relative to conventional solid body heating elements. Additionally, the open structure may facilitate attachment of positional stabilisation components, rods, braces or flanges to mount and/or secure heating element 23 in position within a heating device of the type of FIG. 1. According to further specific implementations, the latticework structure may be designed so as to comprise positional support projections formed integrally as part of the main body 25 and extending radially outward from axis 12 towards and in contact with jacket block 41 and/or an outer housing 11. Such projections may be attached to suitable mounting locations so as to positionally stabilise the heating element 23 in position.

The three-dimensional open structure may be designed so as to achieve the desired surface area contact with the flowing fluid volume. Such surface-to-volume may be defined based on a unit cell (see below) of the latticework main body 25 as the ratio of the total surface area in the unit cell versus the total volume of solid parts of the unit cell, surface area-to volume ratio. That is, the surface area of the strands 45 and nodes of the latticework in relation to the volume of the strands and nodes. According to one embodiment, the surface area-to-volume ratio is not greater than 95:1, such as 1:1 to 95:1.

Such arrangements of heating element 23 may be provided as a single main body 25 having a single repeating unit cell or regions of different unit cells and/or as an assembly having a main body 25 in combination with a secondary body 37. In particular, heating element 23 may be formed as a main body 25 being a continuous skeleton-like framework as described in FIGS. 2 and 3, a framed structure/assembly as illustrated and described referring to FIG. 4 or a multi-component assembly as described referring to FIGS. 5 and 6.

Figure 7A:
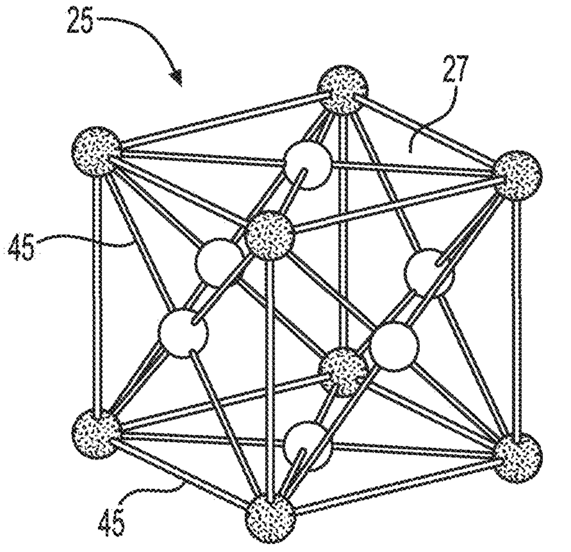
Figure 7B:
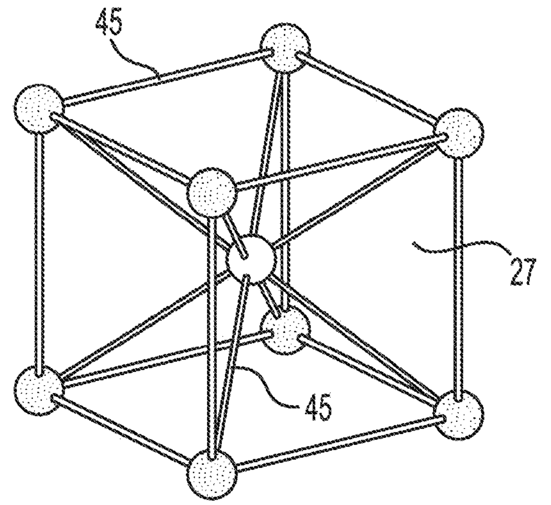

Referring to FIGS. 7*a* and *b*, main body 25 may be regarded as being formed from repeating unit cells with each cell formed from solid strands 45 that are joined or branched to define the 3-dimensional matrix. The strands 45 joined at nodes to form the 3-dimensional matrix. Main body 25 may comprise a single type of unit cell repeating over the entire volume of the latticework or may comprise a plurality of different unit cell geometries to form distinct regions that differ in their surface area-to-volume ratio and hence the size, shape and multiplicity of the internal cavities/pores 27, such as e.g. the first and second regions 60, 62 discussed above with reference to FIG. 2. According to the unit cell configuration of FIG. 7*a*, the main body 25 may be formed for example of face-centred-cubic (fcc) unit cells or referring to FIG. 7*b*, may be formed of body-centred-cubic (bcc) cells, or a combination thereof. The unit cell may have a diameter, or width of at least 0.1 mm. The strand 45 may have a diameter of at least 0.05 mm.

According to some embodiments, the lattice may comprise strands 45 having a diameter or a mean diameter which is greater than 0.05 mm, such as 0.05 to 4 mm. The diameter and mean diameter of a strand 45 is measured perpendicularly to a longitudinal extension of a strand 45. The mean diameter is the average diameter in case the strand 45 does not have a circular cross section.

Figure 7C:
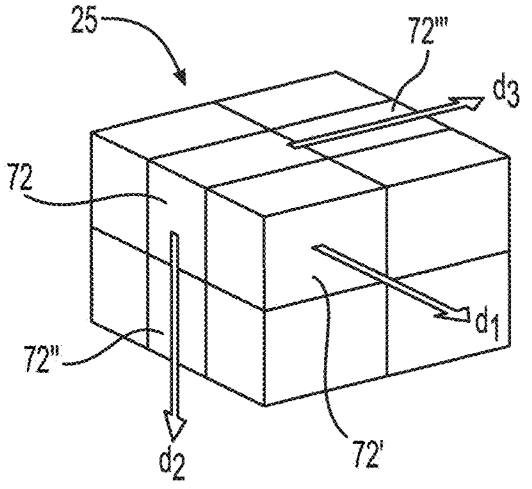
FIG. 7*c* illustrates schematically unit cells arranged adjacent to each other to form part of a latticework main body.

FIG. 7*c* illustrates a number of unit cells 72 of a portion of a main body 25 of a heating element. Each unit cell 72 is schematically shown as a cube and may be of one of the kinds discussed in connection with FIGS. 7*a* and *b*. However, the unit cells 72 are not limited to the shown embodiments but may have any suitable internal structure of strands and any suitable other outer shape, such as e.g. a tetrahedron shape.

The unit cells 72 are arranged next to each other in 3 dimensions, i.e. strands of adjacent unit cells 72 share nodes. More specifically, at corners of each unit cell 72, strands from adjacent unit cells 72 are connected to each other and thus, form nodes. Since each unit cell 72, except at outer surfaces of the main body 25, is surrounded by other unit cells 72, the unit cells are positioned next to each other in three dimensions. Accordingly, the main body 25 comprises at least two unit cells 72, 72' positioned adjacent to each other in a first direction d1, at least two unit cells 72, 72" positioned adjacent to each other in a second direction d2, and at least two unit cells 72, 72''' positioned adjacent to each other in a third direction d3, wherein the first, second, and third directions d1, d2, d3 are arranged at an angle to each other. For instance, if the unit cells 72 have cubic shape, as illustrated, the three directions d1, d2, d3 are orthogonal, if the unit cells 72 have tetrahedron shape, the three directions extend at an angle of 120 degrees to each other.

Figure 8:
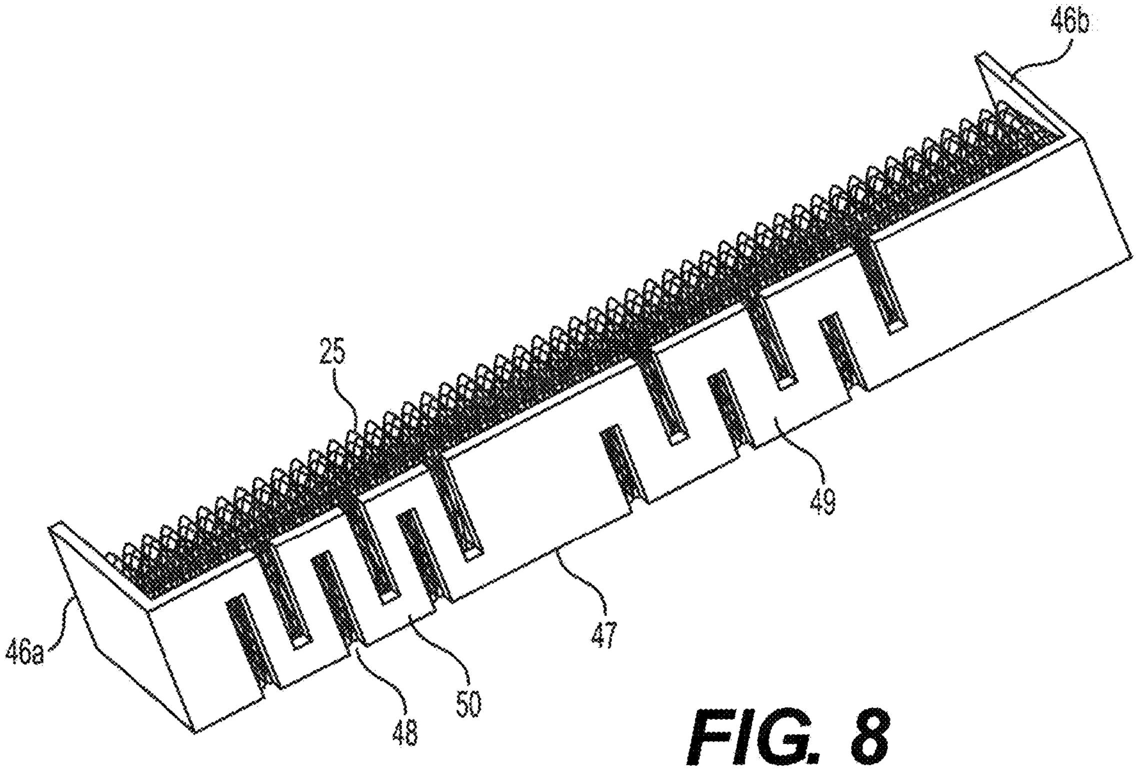
FIG. 8 is a perspective view of a heating element formed as a unitary body including a main body latticework extending between two terminal ends, with a frame part secondary body extending lengthwise with and adjacent to the latticework main body between the terminal ends according to a specific implementation.

A further embodiment of the heating element is described referring to FIG. 8. According to this embodiment, the latticework main body 25 extends axially between two terminal ends 46*a*, 46*b*. Each terminal end 46*a*, 46*b* is formed as a solid, secondary body from the same material as that forming the latticework 25. A frame part 47 comprised in the secondary body extends axially between terminal ends 46*a*, 46*b* immediately adjacent to latticework main body 25. The frame part 47, terminal ends 46*a*, 46*b* and main body 25 are formed integrally preferably via a process such as additive manufacturing. Frame part 47 is provided with slots 48 to alter the electrical current flow characteristics and in particular the electrical resistance of the frame part 47. In such a configuration, the main body 25 provides structural support to the frame part 47 with the main body 25 being considered passive and the frame part 47 being considered active as the primary current flow pathway. Main body 25 accordingly, provides heat energy transfer, which heat is provided indirectly from the current flow passing primarily through the active heating element, i.e. frame part 47.

Figure 9:
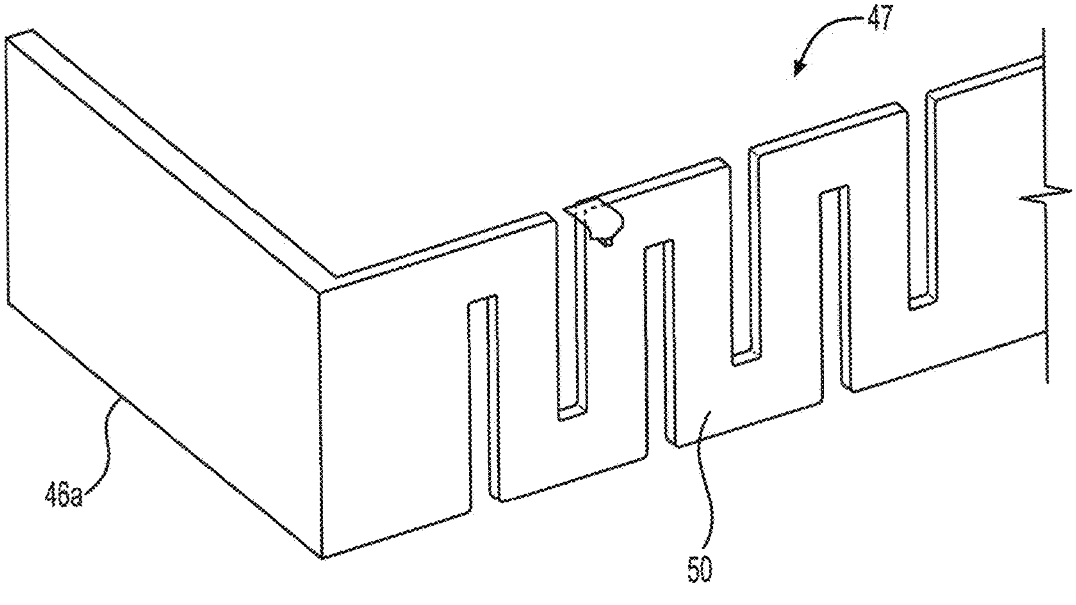
FIG. 9 is a magnified perspective view of an end region of the heating element of FIG. 8 with the latticework main body removed for illustrative purposes.

FIG. 9 is a magnified end view of the heating element of FIG. 8 with the latticework main body removed for illustrative purposes. As shown, the terminal ends 46*a* are formed from relatively short plates positioned orthogonal to the elongate heating element, i.e. the main body 25, and to active current flow frame part 47). The terminal ends 46*a*, 46*b* comprise a much larger cross-sectional area than the frame part 47 or the main body 25, in a plane perpendicular to the direction of current flow between terminal ends 46*a*, 46*b*. Accordingly, the larger cross-sectional size of the terminal ends 46*a*, 46*b* provides that they do not radiate heat. The cross-sectional area of the latticework main body 25 is relatively small such that only negligible current would pass through the lattice of main body 25. Accordingly, the lattice main body 25 is provided as the passive component. As illustrated in FIG. 9, the cross-sectional area of the frame part 47 is smaller than the terminal ends 46*a*, 46*b* to provide higher electrical resistivity and in turn a greater heating effect. As illustrated in the example of FIGS. 8 and 9, the frame part 47 via the slots 48 comprises a lengthwise extending meandering pathway between terminal ends 46*a*, 46*b*.

As will be appreciated, frame part 47 comprises wider current flow path regions 49 relative to narrower flow path regions 50. Accordingly, the electrical resistivity in the narrow regions 50 will be greater to provide increased heat energy transfer. As such, the active frame part 47 is provided with regions 49, 50 offering differential heating effects along its length (between terminal ends 46*a*, 46*b*) which may be advantageous to provide differential heating zones within a heating device. Such an arrangement may be used for heating irregular solid objects, for example to obtain uniform heating of an irregular object by differential heating of the different zones/regions of the irregular object.

According to specific implementations, the terminal ends 46*a*, 46*b* may also be provided with different cross-sectional areas both in the widthwise direction and lengthwise direction. For example, the cross-sectional area in the plane perpendicular to the current flow direction, i.e. between ends 46*a*, 46*b*, may be tapered so as to decrease in a direction outward from latticework main body 25 and towards an outer casing of the heating device.

With reference to the summary of the invention and the detailed description of preferred embodiments above, an itemised list related to the present invention is presented:

Item 1. A heating element in a heating device, assembly or apparatus, the heating element comprising:
- a main body;
- the main body being a three-dimensional matrix having an open structure defining openings, voids and/or pores extending through the main body.

Item 2. The heating element as per item 1, wherein the matrix is provided as a lattice having a repeating unit cell to define a main body having a pattern.

Item 3. The heating element as per item 2, wherein the pattern is uniform and the main body comprises openings, voids and/or pores of a size and shape that are generally homogenous throughout the main body.

Item 4. The heating element as per item 1 or 2, the main body comprising at least a first region having a first lattice type and at least a second region having a second lattice type different to the first region.

Item 5. The heating element as per item 4 wherein the first and second regions differ by any one or a combination of:
- a shape or geometry of the lattice;
- a density of the lattice;
- a cross-sectional area, thickness or width of strands that form the lattice;
- a size, shape or number of openings, voids and/or pores that extend throughout the main body.

Item 6. The heating element as per item 4 or 5 wherein the first and second regions are positioned to extend in a lengthwise and/or widthwise direction across the heating element relative to a lengthwise direction extending between respective terminal ends.

Item 7. The heating element as per any preceding item, wherein the matrix comprises a corrugated, skeletal or caged framework or structure.

Item 8. The heating element as per any preceding item, wherein the matrix comprises at least one electrically conductive material.

Item 9. The heating element as per item 6, wherein the main body extends radially from a centre to an outer surface of the heating element.

Item 10. The heating element as per any preceding item comprising an electrically conductive secondary body, the main body positioned adjacent the secondary body.

Item 11. The heating element as per item 10, wherein the secondary body comprises the same material as the main body and/or is formed integrally with the main body.

Item 12. The heating element as per item 10 or 11, wherein the secondary body is more dense, or solid, relative to the main body, having a lower degree of, or being devoid of openings, voids and/or pores that extend through the main body.

Item 13. The heating element as per any one of items 10 to 12, wherein the secondary body extends lengthwise with the main body between respective terminals of the heating element.

Item 14. The heating element as per any one of items 10 to 13, wherein the secondary body extends widthwise or orthogonal to a length of the heating element.

Item 15. The heating element as per any one of items 10 to 14, wherein the secondary body comprises a cross-sectional area, width or thickness that is uniform or is variable.

Item 16. A method of manufacturing a heating element as per any preceding item via an additive manufacturing process.

The invention claimed is:

1. A heating element, comprising:

a main body, the main body being a three-dimensional matrix having an open structure defining openings, voids and/or pores extending through the main body, wherein the three-dimensional matrix is provided as a lattice having a repeating unit cell to define at least part of the main body, wherein the main body comprises at least two unit cells positioned adjacent to each other in a first direction (d1), at least two unit cells positioned adjacent to each other in a second direction (d2), and at least two unit cells positioned adjacent to each other in a third direction (d3), wherein the first, second, and third directions are arranged at an angle to each other, and wherein the repeating unit cell has a cubic shape and the first, second, and third directions are arranged orthogonally.

2. The heating element as claimed in claim 1, wherein the lattice comprises strands.

3. The heating element as claimed in claim 2, wherein the strands connect to each other in nodes to form the lattice of the three-dimensional matrix.

4. The heating element as claimed in claim 1, wherein the repeating unit cell defining the main body has a pattern and the pattern is uniform and the main body comprises openings, voids and/or pores of a size and shape that are generally homogenous throughout the main body.

5. The heating element as claimed in claim 1, the main body comprising at least a first region having a first lattice type and at least a second region having a second lattice type different to the first region.

6. The heating element as claimed in claim 5, wherein the first and second regions differ by any one or a combination of:

a shape or geometry of the lattice;

a density of the lattice;

a cross-sectional area, thickness or width of strands that form the lattice;

a size, shape or number of openings, voids and/or pores that extend throughout the main body.

7. The heating element as claimed in claim 5, wherein the first and second regions are positioned to extend in a lengthwise and/or widthwise direction across the heating element relative to a lengthwise direction extending between respective terminal ends.

8. The heating element as claimed in claim 1, wherein the matrix comprises at least one electrically conductive material.

9. The heating element as claimed in claim 8, wherein the electrically conductive material is selected from the group of iron-chromium-aluminium alloy, nickel-chromium alloy, copper-nickel based alloy, iron-nickel-chromium alloy, nickel-iron-chromium-aluminium alloy, ceramic material, and intermetallic material.

10. The heating element as claimed in claim 8, wherein the electrically conductive material has a resistivity within a range of from 0.1 to 1000 $\Omega mm^2/m$.

11. The heating element as claimed in claim 1, the main body comprises a surface area-to-volume ratio not greater than 95:1.

12. The heating element as claimed claim 1, wherein the lattice comprises strands having a diameter or a mean diameter which is greater than 0.05 mm.

13. The heating element as claimed in claim 1, wherein the main body is a result of an additive manufacturing process.

14. The heating element as claimed in claim 1, comprising an electrically conductive secondary body, the main body positioned adjacent the secondary body.

15. The heating element as claimed in claim 14, wherein the secondary body comprises the same material as the main body and/or is formed integrally with the main body.

16. The heating element as claimed in claim 14, wherein the secondary body is more dense, or solid, relative to the main body, having a lower degree of, or being devoid of openings, voids and/or pores that extend through the main body.

17. The heating element as claimed in claim 14, wherein the secondary body extends lengthwise with the main body between respective terminals of the heating element.

18. The heating element as claimed in claim 14, wherein the secondary body extends widthwise or orthogonal to a length of the heating element.

19. The heating element as claimed in claim 1, wherein the heating element is a unitary body.

20. A method of manufacturing a heating element as claimed in claim 1 via an additive manufacturing process.

21. A heating element, comprising:

a main body, the main body being a three-dimensional matrix having an open structure defining openings, voids and/or pores extending through the main body wherein the three-dimensional matrix is provided as a lattice having a repeating unit cell to define at least part of the main body wherein the main body comprises at least two unit cells positioned adjacent to each other in a first direction (d1), at least two unit cells positioned adjacent to each other in a second direction (d2), and at least two unit cells positioned adjacent to each other in a third direction (d3), wherein the first, second, and third directions are arranged at an angle to each other, and wherein the repeating unit cell has a tetrahedron shape and the angle is 120 degrees.

22. A heating element, comprising:

a main body, the main body being a three-dimensional matrix having an open structure defining openings, voids and/or pores extending through the main body, wherein the three-dimensional matrix is provided as a lattice having a repeating unit cell to define at least part of the main body, wherein the main body comprises at least two unit cells positioned adjacent to each other in a first direction (d1), at least two unit cells positioned adjacent to each other in a second direction (d2), and at least two unit cells positioned adjacent to each other in a third direction (d3), wherein the first, second, and third directions are arranged at an angle to each other, wherein the main body comprises a first region having a first unit cell configuration and a second region having a second unit cell configuration, wherein the first unit cell configuration differs from the second unit cell configuration, and wherein the first unit cell configuration is selected from a face-centred-cubic configuration and a body-centred-cubic configuration.

23. The heating element as claimed in claim 21, wherein the matrix comprises at least one electrically conductive material, and wherein the electrically conductive material is selected from the group of iron-chromium-aluminium alloy, nickel-chromium alloy, copper-nickel based alloy, iron-nickel-chromium alloy, nickel-iron-chromium-aluminium alloy, ceramic material, and intermetallic material.

24. The heating element as claimed in claim 22, wherein the matrix comprises at least one electrically conductive material, and wherein the electrically conductive material is selected from the group of iron-chromium-aluminium alloy, nickel-chromium alloy, copper-nickel based alloy, iron-nickel-chromium alloy, nickel-iron-chromium-aluminium alloy, ceramic material, and intermetallic material.

* * * * *